(12) United States Patent
Gallet

(10) Patent No.: US 8,956,487 B2
(45) Date of Patent: Feb. 17, 2015

(54) ROTOR BLADE OF A GAS TURBINE ENGINE MADE OF COMPOSITE MATERIAL COMPRISING A CONNECTING YOKE, METHOD FOR MANUFACTURING THE BLADE

(75) Inventor: Francois Gallet, Paris (FR)

(73) Assignee: SNECMA, Paris (FR)

( * ) Notice: Subject to any disclaimer, the term of this patent is extended or adjusted under 35 U.S.C. 154(b) by 738 days.

(21) Appl. No.: 13/186,621

(22) Filed: Jul. 20, 2011

(65) Prior Publication Data
US 2012/0018079 A1    Jan. 26, 2012

(30) Foreign Application Priority Data

Jul. 21, 2010 (FR) ................................. 10 55925

(51) Int. Cl.
| | |
|---|---|
| *F16L 11/08* | (2006.01) |
| *F01D 5/28* | (2006.01) |
| *B29C 70/54* | (2006.01) |
| *B29C 70/86* | (2006.01) |
| *F01D 5/30* | (2006.01) |
| *B29C 70/48* | (2006.01) |
| *B29L 31/08* | (2006.01) |

(52) U.S. Cl.
CPC ............. *F01D 5/282* (2013.01); *B29C 70/545* (2013.01); *B29C 70/86* (2013.01); *F01D 5/3053* (2013.01); *B29C 70/48* (2013.01); *B29L 2031/08* (2013.01); *B29L 2031/082* (2013.01); *Y02T 50/672* (2013.01); *F05D 2220/323* (2013.01); *F05D 2220/36* (2013.01); *F05D 2230/10* (2013.01); *F05D 2300/702* (2013.01); *F05D 2300/614* (2013.01)
USPC ............. 156/148; 464/181; 464/183; 29/889; 29/889.7; 29/889.2

(58) Field of Classification Search
CPC ....................... B29L 2031/085; B29L 2031/08
USPC .......... 464/180, 181, 182, 183; 156/148, 166, 156/167, 168, 172, 173, 177; 416/230, 416/229 R, 229 A; 29/889, 899.6, 899.71, 29/899.72, 557, 558; 264/103, 257, 263
See application file for complete search history.

(56) References Cited

U.S. PATENT DOCUMENTS

| | | | |
|---|---|---|---|
| 5,129,787 A |   | 7/1992 | Violette et al. |
| 5,165,856 A | * | 11/1992 | Schilling et al. .......... 416/204 R |
| 5,240,377 A | * | 8/1993 | Farr .......................... 416/229 R |
| 5,409,353 A | * | 4/1995 | Imbault ..................... 416/212 A |
| 5,672,417 A | * | 9/1997 | Champenois et al. ........ 442/208 |
| 6,431,837 B1 |   | 8/2002 | Velicki |

FOREIGN PATENT DOCUMENTS

| | | |
|---|---|---|
| EP | 0 607 082 A1 | 7/1994 |
| FR | 1 073 330 | 9/1954 |

OTHER PUBLICATIONS

French Preliminary Search Report and written opinion issued Mar. 25, 2010, in French 1055925, filed Jul. 21, 2010 (with English Translation of Category of Cited Documents).

* cited by examiner

*Primary Examiner* — Jacob T Minskey
*Assistant Examiner* — Vishal I Patel
(74) *Attorney, Agent, or Firm* — Oblon, Spivak, McClelland, Maier & Neustadt, L.L.P.

(57) ABSTRACT

A rotor blade of a turbine engine comprising a body made of composite material consisting of a fiber-reinforced thermosetting resin and a connecting yoke designed to be attached to a fastener of a rotor disc of the said turbine engine, the said blade characterized in that the connecting yoke comprises a metal reinforcement and a casing made of composite material encasing the said reinforcement.

6 Claims, 2 Drawing Sheets

ROTOR BLADE OF A GAS TURBINE ENGINE MADE OF COMPOSITE MATERIAL COMPRISING A CONNECTING YOKE, METHOD FOR MANUFACTURING THE BLADE

The field of the invention is that of gas turbine engines for aircraft. The invention relates more particularly to a device for fastening fan blades made of composite material of a turbine engine.

A turbine engine conventionally comprises a fan comprising a fan disc onto which fan blades are mounted in order to supply the thrust necessary to move the aircraft. A turbine engine said to be an "open rotor" turbine engine conventionally comprises two non-streamlined fans that are also called propellers.

Known through the patent application FR2933955 A1 made by SNECMA is a device for fastening a variable-pitch blade in order to optimize the operation of a fan. The blade is connected to a fastener forming a pivot rotating in a housing of the fan disc hub. The blade and the fastener are often separate parts, the blade being made of composite material in order to lighten the weight, the fastener remaining metallic in order to withstand the forces to which it is subjected.

A composite material consists of a framework called a reinforcement which provides the mechanical strength and of a protection called a matrix which provides the cohesion of the structure and the transfer of the forces back to the reinforcement. In particular a resin-injection moulding method (called the RTM method for "Resin Transfer Moulding") is known that makes it possible to form composites in which a thermosetting resin, with relatively low viscosity, is injected at low pressure, through a dry reinforcement placed in a closed mould. For composite materials with a reinforcement comprising glass fibres, the blades obtained have a reduced weight but do not withstand high temperatures.

The known fasteners for blades made of composite material have drawbacks. First of all, the zone for fastening the blade to the fan disk is a critical zone and is highly stressed mechanically. In particular, the vibration modes of the blade may lead to high mechanical stresses capable of damaging the blade. Moreover, the fastening zone is subjected to considerable heat stresses that are harmful for blades made of composite material. Finally, the fastener of the blade must have great reliability, since a failure of the fastener causes the fan blade to be ejected and potentially damages the engine.

With reference to FIG. 1, showing a fastener as proposed by FR2933955 A1, a first known solution consists in providing a metal fastener 3 of a fan disk 1 comprising a dovetail bore 31 for a root 61 of a blade 6 made of composite material. In this example, since the blade 6 is arranged to be attached in the bore 31, no clearance of the blade 6 is possible. Therefore, the vibration modes of the blade 6 are in the operating range of the engine which may generate a resonance of the blade 6. If the fastener fails, for example a breakage of the bore or of the blade root, the blade is directly released. There is no device making it possible to back up the bore, that is to say a redundancy of the hold on the blade by the fastener. Such a fastener is capable of improvement.

A second known solution consists in providing a fastener, forming a pivot with the fan disc, which comprises a metal yoke arranged to interact with a metal yoke of a blade comprising a core of metal material and a skin made of composite material encasing the said core. As is known, a yoke comprises a plurality of lugs each comprising an orifice, the lugs being aligned so that their orifices all extend along one and the same axis. As is known, a metal yoke comprises a plurality of cylindrical portions arranged in the lugs so as to form a tubular passageway in the yoke which traverses the orifices of the said lugs.

After interaction of the metal yokes, the cylindrical portions form a substantially continuous tubular passageway in which a pin is inserted which makes it possible, on the one hand, to secure the blade to the fastener and, on the other hand, to form a pivot to allow a clearance of the blade relative to the fastener in the manner of a hinge. Such a connection makes it possible to limit the vibratory phenomena. This solution however is not satisfactory since the weight saving obtained by the skin made of composite material is partly lost by the addition of weight of the metal yoke. Moreover, the zone of connection between the metal core of the blade and its skin made of composite material constitutes a zone of mechanical weakness because of the lack of uniformity of the materials. Moreover, from a heat point of view, the metal yoke conducts the heat from the fastener to the blade made of composite material which is a drawback. Such a fastener is unsatisfactory.

In order to eliminate at least some of the abovementioned drawbacks, the invention relates to a rotor blade of a turbine engine comprising a body made of composite material consisting of a fibre-reinforced thermosetting resin and a connecting yoke designed to be attached to a fastener of a rotor disc of the said turbine engine, in which blade the connecting yoke comprises a metal reinforcement and a casing made of composite material encasing the said reinforcement.

A metal reinforcement encased in composite material is arranged to receive a pin in order to attach the rotor blade to the fastener of the rotor disc.

By virtue of the invention, the blade is formed essentially of composite material which provides a considerable weight saving without causing weaknesses. Since the casing of the yoke and the body are made of composite material, there is no non-uniform zone between the yoke and the blade which limits the zones of weakness with respect to the mechanical stresses. The reinforcement of the metal yoke makes it possible to provide a good quality connection with the fastener without conducting heat from the yoke to the blade. The pivot connection between the blade and its fastener makes it possible to limit the vibratory stresses and to effectively withstand the phenomena of ingestion of foreign bodies. Finally, a fastener in the form of a yoke makes it possible to increase the reliability of the fastener in the event of breakage of a connection element. Advantageously a benefit is derived from the advantages of the solutions of the prior art by eliminating their faults.

Preferably, the connecting yoke comprises at least two lugs in which a tubular passageway is formed, the metal reinforcement forming the said tubular passageway. Advantageously, in the event of breakage of a first lug, a second lug makes it possible to hold the blade and thus prevent its ejection.

Preferably, the metal reinforcement is tubular and is placed in the connecting yoke, that is to say internally.

According to one aspect of the invention, the casing of the connecting yoke is formed of composite material consisting of a fibre-reinforced thermosetting resin. The reinforcing fibres advantageously make it possible to incorporate the metal reinforcement into the yoke in order to thus form a hybrid connecting yoke.

Preferably, since the metal reinforcement extends in one direction, the fibres of the casing surrounding the reinforcement form a nonzero angle with the direction of the reinforcement.

According to a first embodiment of the invention, the fibres of the casing surrounding the reinforcement form a perpendicular angle with the direction of the reinforcement. This incorporates in a practical manner the metal reinforcement in the reinforcing fibres, the reinforcing fibres, for example, surrounding the circumference of the metal reinforcement in order to form a yoke of which the casing has parallel fibres. Preferably, the casing has a constant thickness. Also preferably, the fibres of the casing are uniformly distributed over the length of the reinforcement.

According to a second embodiment of the invention, the fibres of the casing extend obliquely to the direction of the reinforcement in at least two different directions. Therefore, it is advantageously possible to form yokes comprising a thick casing by crossing the fibres and superposing them during the formation of the casing. The casing obtained has a considerable rigidity. In comparison with orthogonal fibres for which the thickness of the casing is a function of the thickness of the blade body, oblique fibres make it possible to use a larger quantity of fibres in order to form the casing but without increasing the thickness of the blade body.

Preferably, the fibres of the blade body are continuous with the fibres of the casing of the connecting yoke. This gives a sturdy and continuous connection between the yoke and the connecting body which limits the mechanical and thermal stresses.

The invention also relates to an assembly of a rotor blade, as described above, and a fastener of a rotor disc comprising a fastening yoke comprising a passageway, the assembly comprising a pin extending in the reinforcement of the connecting yoke and in the passageway of the fastening yoke so as to attach them firmly together.

The invention also relates to a method for manufacturing a rotor blade of a gas turbine engine comprising a body made of composite material and a connecting yoke designed to be attached to a fastener of a rotor disc of the said turbine engine, the said method comprising the following steps:
 a step of installing fibres around a metal tube;
 a step of injecting thermosetting resin in order to form a casing made of composite material around the metal tube and
 a step of machining at least one section of the said metal tube in order to form a connecting yoke for the blade comprising a plurality of independent sections, forming the reinforcement of the connecting yoke, encased in composite material.

Advantageously, the method according to the invention makes it possible to incorporate the metal tube in the casing of the connecting yoke. The machining of the yoke after the installation of the fibres makes it possible to obtain precise geometries of the yoke.

Preferably, since the body of the blade made of composite material consists of a fibre-reinforced thermosetting resin, the method comprises a step of installing the fibres of the blade body around the metal tube in order to form the casing made of composite material around the metal tube.

By using the fibres of the blade body in order to form the casing of the yoke, advantageously a sturdy and continuous connection is obtained between the connecting yoke and the blade body which limits the mechanical and thermal stresses.

Also preferably, the method comprises the following steps:
 a step of installing fibres around a metal tube in order to form a casing of composite material around the metal tube, the tube comprising at least two sections having a high density of fibres and at least one section having a low density of fibres arranged between the two sections having a high density of fibres; and
 a step of machining the section having a low density of fibres so as to form the connecting yoke for the blade comprising two sections having a high density of fibres, forming the reinforcement of the connecting yoke, encased in composite material.

The casing does not have a uniform density of fibres over the length of the metal tube but comprises zones of high density and zones of low density. The fibres are therefore concentrated on given sections of the metal tube in order to form a sturdy casing. Advantageously, the sections having a low density of fibres are machined so as to form the yoke with the sections having a high density of fibres. Thus, a large number of fibres is involved in the formation of the connecting yoke.

Preferably, the method comprises a step of weaving fibres around the metal tube, the weave comprising warp threads placed along the cord of the said blade and weft threads placed along the height of the blade.

Also preferably, the method comprises a step of weaving by means of a weaving shuttle in which the shuttle makes back-and-forth movements depending on the height of the blade so that the weft threads fit tightly round the metal tube.

The invention will be better understood with the aid of the appended drawing in which.

Figure 1:
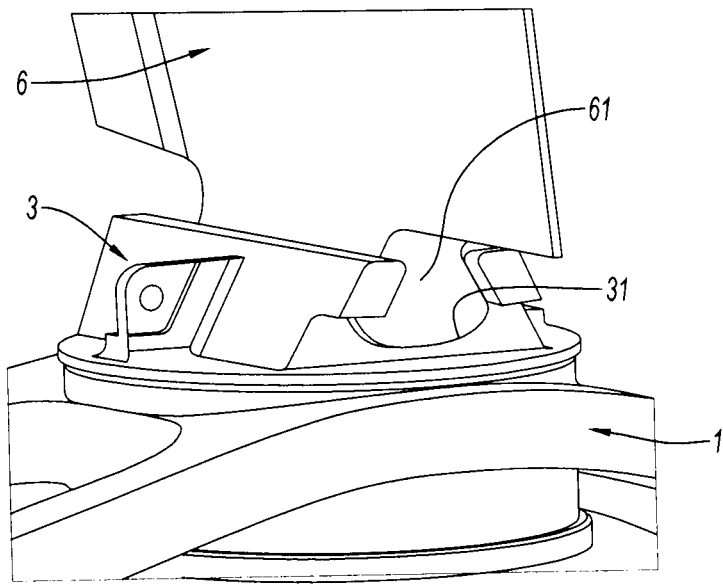
FIG. 1 is a view in perspective of a blade of a turbine engine mounted in a dovetail fastener according to the prior art (already discussed)
Figure 2:
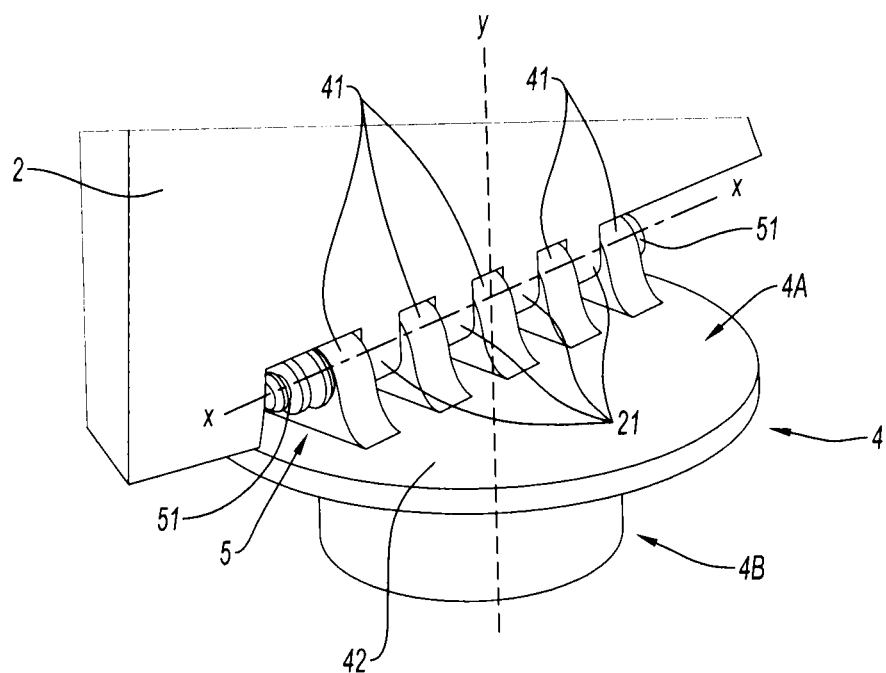
FIG. 2 is a view in perspective of a rotor blade of a gas turbine engine according to the invention connected to a fastener of a rotor disc.

A fan blade 2 of an "open rotor" engine is shown with reference to FIG. 2. This blade 2 is connected to a fastener 4 of a rotor disc by means of a fastening device formed by two yokes 21, 41 connected by a tubular pin 5 like a hinge in order to form a pivoting connection between the blade 2 and its fastener 4. The fastener 4 makes it possible to hold the blade 2 that is subjected to the centrifugal forces during the rotation of the fan disc.

In this example, the fastener 4 is metallic in order to withstand the forces. The fastener 4 comprises a top portion 4A, forming a plate 42, on which the fastener yoke 41 is arranged, and a cylindrical bottom portion 4B suitable for fitting into the fan disc so as to form a pivoting connection with the fan disc along a radial axis reference Y in FIG. 2. A horizontal axis X, along which the pin 5 extends is represented in FIG. 2 so as to form with the axis Y an orthogonal coordinate system (X, Y). The fastener 4 makes it possible to pitch the blade 2 angularly relative to the fan disc, the blade 2 being said to be a "variable-pitch" blade.

The fastening yoke 41 takes the form of a plurality of lugs 41 secured and orthogonal to the said plate 42 and extending radially outwards in the direction Y. Each lug 41 comprises an orifice designed to receive the pin 5 extending in the direction X. The orifices of the lugs extend along one and the same axis X in order to form a tubular passageway corresponding to the dimensions of the tubular pin 5. The pin 5 is also known to those skilled in the art by the name "bush".

The rotor blade 2 comprises a body 20 made of composite material consisting of a fibre-reinforced thermosetting resin and a connecting yoke 21 arranged at the bottom end of the body 20 designed to be attached to the fastener 4. In a manner similar to the fastening yoke 41, the connecting yoke 21 takes the form of a plurality of lugs 21 secured to the body 20 extending in the direction Y inwards. Each lug 21 comprises an orifice designed to receive the pin 5 extending in the direction X. The orifices of the lugs extend on one and the same axis X in order to form a tubular passageway corresponding to the dimensions of the tubular pin 5.

As shown in FIG. 2, the lugs of the connecting yoke 21 are equidistant from one another, the distance separating two consecutive lugs corresponding to the thickness of a lug of the fastening yoke 41. Similarly, the lugs of the fastening yoke 41 are equidistant from one another, the distance separating two consecutive lugs corresponding to the thickness of a lug of the connecting yoke 21. Thus, when the yokes 21, 41 interact, the orifices of the said yokes 21, 41 are aligned along the axis X and form a continuous tubular passageway for the insertion of the pin 5.

According to the invention, the connecting yoke 21 comprises a metal reinforcement 25 and a casing made of composite material formed of a fibre-reinforced thermosetting resin encasing the metal reinforcement 25. The orifices of the lugs of the connecting yoke 21 form the metal reinforcement 25 corresponding to the zone of contact between the pin 5 and the connecting yoke 21. Thus, the metal reinforcement 25 is arranged to allow the pin 5 to pass through the lugs, the casing of the reinforcement 25 connecting the yoke 21 to the body 20 of the blade 2.

The body 20 and the casing of the connecting yoke 21 of the blade 2 are formed of a composite material consisting of a framework called a reinforcement (in this instance formed of glass or carbon fibres) which provides the mechanical strength and a protection (in this instance formed of thermosetting resin) called a matrix which provides the cohesion of the structure and the transmission of the forces back to the reinforcement. In this example, the composite material is made by developing a 3D fibre preform, that is to say a weaving or a braiding of fibres in three dimensions. Such a preform is then densified with a polymer (resin) to produce the finished composite part, in which the fibres of the preform are embedded within a solid polymer matrix.

A known technique for achieving such a densification is for example liquid impregnation in which the preform is placed in a mould, then a chemical precursor of the polymer in liquid form is injected into the mould at several points until the mould is filled completely (the RTM process meaning "Resin Transfer Moulding"), and is then polymerized by heat treatment.

In this example, glass fibres or carbon fibres are used to form the body 20 of the blade 2 and the casing of the connecting yoke 21 but it goes without saying that other composite materials could be equally suitable.

For the purposes of clarity, the same reference number is used to indicate the metal reinforcement and the metal tube used to form the metal reinforcement because these terms refer to one and the same element at different stages of its manufacture.

Figure 3:
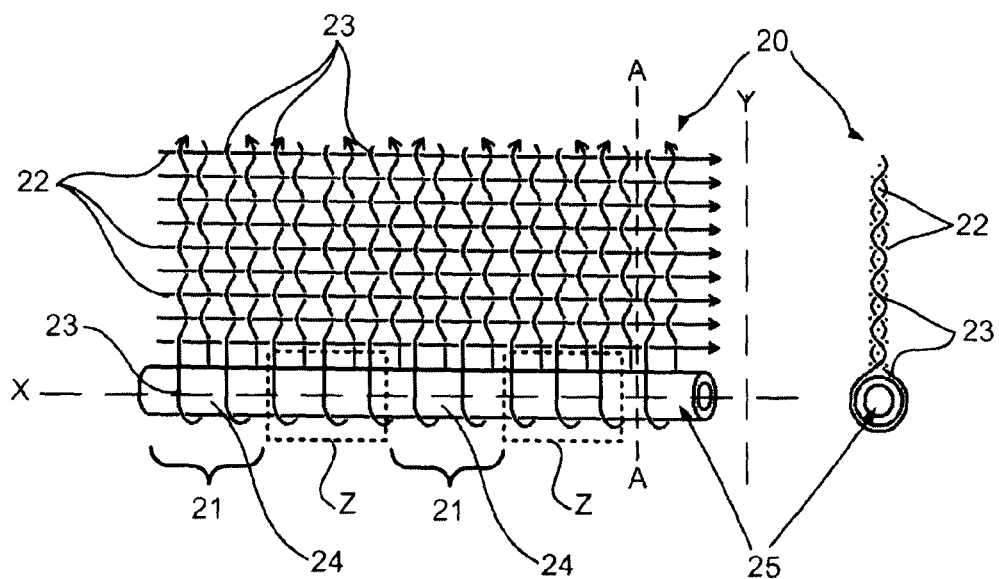
FIG. 3 is a schematic representation of a first embodiment of a casing of the yoke, the casing being shown in front view and in a view in cross section in the direction A-A.

With reference now to FIG. 3 showing a first embodiment of a casing made of composite material in order to form a blade according to the invention, a metal tube 25, extending along the axis X, is held in a mesh of fibres. Hereinafter the fibres are called weft threads 23 or warp threads 22 in a mesh of fibres or in a weave of fibres. In this example, the weft threads 23 extend along the axis Y and the warp threads 22 extend along the axis X, parallel to the direction of the metal tube 25. Preferably, the fibres are woven, the weave comprising warp threads placed along the cord of the said blade and weft threads placed along the height of the blade. The height and the cord of the blade are blade dimensions that are well known to those skilled in the art.

In other words, the reinforcement of the composite material is formed of a set of threads 22, 23 woven at right angles to one another. The metal tube 25 is incorporated into the composite material during the weaving so that the weft threads 23 surround the circumference of the tube 25 so as to encase it. A weaving shuttle (not shown) makes a half-turn around the metal tube 25 with the weft threads 23 in order to incorporate the tube 25 into the connecting yoke 21.

After having woven a certain length and incorporated the metal tube 25, the polymer (in this instance a thermosetting resin) is injected according to the RTM process. Then, several longitudinal portions Z of the metal tube 25 with their casing are ground out so as to form independent portions of tube 24. The independent portions of tube 24 with their casing made of composite material form the lugs of the connecting yoke 21 of the blade 2, all of the portions of tube 24 forming the metal reinforcement 25 of the connecting yoke 21.

The threads 22, 23 form, on the one hand, the connecting yoke 21 and, on the other hand, the body 20 of the blade 2. When the threads 22, 23 are continuous between the connecting yoke 21 and the body 20, there is no zone of mechanical weakness at the interface which increases the service life of the blade 2.

With reference to FIG. 3, the density of fibres around the metal tube 25 is substantially uniform but it goes without saying that the metal tube 25 may comprise sections having a low density of fibres and sections having a high density of fibres. According to this variant, the sections with a low density of fibres are machined so as to form a connecting yoke with the sections having a high density of fibres.

Figure 4:
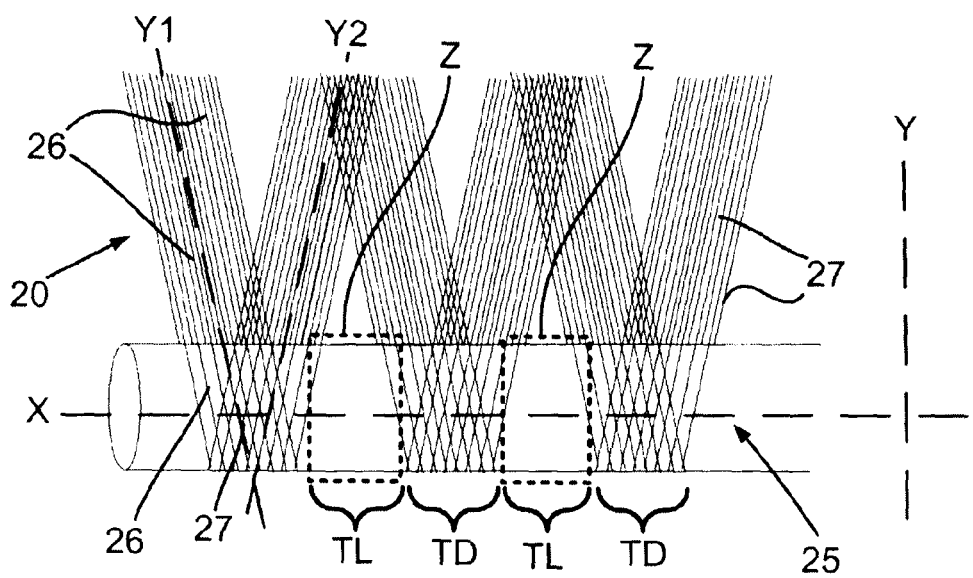
FIG. 4 is a schematic representation of a second embodiment of a casing of the yoke.

With reference now to FIG. 4, representing a second embodiment of a casing made of composite material to form a blade according to the invention, a metal tube 25, extending along the axis X, is held in a mesh of weft threads 26, extending obliquely along a first axis Y1, and of warp threads 27 extending obliquely along a second axis Y2, obliquely to the direction of the metal tube 25. In other words, the composite material is formed of a set of threads 26, 27 woven obliquely with one another. The metal tube 25 is incorporated into the composite material during the weaving so that the weft threads 26 and the warp threads 27 surround the circumference of the tube 25. The threads 26, 27 cross around the metal tube 25 in order to form a sturdy casing for the connecting yolk 21.

In this embodiment, the weaving is carried out so as to form a casing of fibres the density of which is not uniform around the metal tube 25. As shown in FIG. 4, the metal tube 25 thus comprises sections having a low density of fibres TL and sections having a high density of fibres TD. In other words, the warp threads 26 and the weft threads 27 surround the metal tube 25 essentially in the sections having a high density TD.

After polymerization according to an RTM process, in order to form the yoke 21, the sections having a weave of low density TL are machined with their casing so as to form spaces between the sections having a high density TD. During the machining, the sections referenced Z in FIG. 4 are removed, the length of the removed section corresponding to the thickness of a lug of a fastening yoke 41. Advantageously, with this type of weaving, the number of fibres that are cut out to form the yoke 21 is limited, which makes it possible to increase the mechanical strength of the blade 2 with its yoke 21.

After formation of the connecting yoke 21 of the blade 2, the latter is connected to the fastener 4 of the fan disc by inserting a pin 5 in the direction X so as to pass through alternately an orifice of the connecting yolk 21 and an orifice of the fastening yoke 41. In order to make the pin 5 secure in the tubular passageway defined by the yolks 21, 41, shims 51 are installed at the ends of the pin 5 so as to prevent a movement of the pin 5 along the axis X.

During the operation of the engine, the blades 2 are rotated by the fan disc, the angular pitch of the blades being able to be modified by rotating the fastener 4 around the axis Y. A clearance of the blade 2 about the axis X is possible because of the pivoting connection formed by the pin 5 so as to limit the transmission of vibratory forces. Moreover, the connecting yoke 21 advantageously makes it possible to create a redundancy in the retention of the blade 2 relative to its fan disc. In the event of breakage of one lug of the connecting yoke 21, the other lugs continue to hold the blade 2. From the thermal point of view, the heat is confined to the fastener 4, the metal reinforcement 25 of the connecting yoke 21 makes it possible to form a connection compatible with the pin 5 and the fastening yoke 41 by limiting the transfer of heat from the fastener 4 to the blade 2.

The invention has been shown for an "open rotor" turbine engine with propellers but it goes without saying that the invention equally applies to other turbine engines, in particular, a turbine engine comprising a streamlined upstream fan of the CFM 56 type.

Similarly, the fibres have been shown making a half-turn around the metal tube 25, but it goes without saying that other integration means could equally be appropriate. For example, the fibres could be knotted to the metal tube 25.

The invention claimed is:

1. A method for manufacturing a rotor blade of a gas turbine engine including a body made of composite material and a connecting yoke designed to be attached to a fastener of a rotor disc of the turbine engine, the method comprising the following steps:

installing fibers around a metal tube;

injecting thermosetting resin in order to form a casing of composite material around the metal tube, the tube including at least two sections having a first density of fibers, and at least one section having a second density of fibers arranged between the two sections having a first density of fibers, the second density being less than the first density and greater than zero; and machining the section having the second density of fibers so as to remove a portion of the metal tube around which is installed the second density of fibers, and to thereby form a connecting yoke for the blade including the two sections having the first density of fibers, forming a reinforcement of the connecting yoke, encased in composite material.

2. The method according to claim 1, wherein the installing fibers includes weaving the fibers around the metal tube, the weave including warp threads placed along a cord of the blade and weft threads placed along a height of the blade.

3. The method according to claim 2, wherein the weft threads are woven so as to surround a circumference of the metal tube.

4. The method according to claim 2, wherein the weft threads and the warp threads are woven so as to surround a circumference of the metal tube.

5. The method according to claim 1, wherein the installing fibers includes weaving fibers at right angles to one another.

6. The method according to claim 1, wherein the installing fibers includes weaving fibers obliquely with one another.

* * * * *